US006495648B1

(12) United States Patent
Inagaki et al.

(10) Patent No.: US 6,495,648 B1
(45) **Date of Patent: *Dec. 17, 2002**

(54) TONER BINDER RESIN AND PROCESS FOR THE PRODUCTION THEREOF

(75) Inventors: Motoshi Inagaki; Koji Shimizu; Yoko Harada; Junya Nakamura, all of Toyohashi (JP)

(73) Assignee: Mitsubishi Rayon Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/560,589

(22) Filed: Apr. 28, 2000

Related U.S. Application Data

(63) Continuation of application No. PCT/JP98/04844, filed on Oct. 26, 1998.

(30) Foreign Application Priority Data

Oct. 31, 1997 (JP) .......... 9-299710
Sep. 29, 1998 (JP) .......... 10-275634

(51) Int. Cl.[7] .......... C08F 212/06; G03G 9/087

(52) U.S. Cl. .......... 526/347; 526/318.25; 526/318.6; 526/324; 526/329.2; 528/501; 528/503; 430/109.3; 430/137.15; 430/910; 428/402

(58) Field of Search .......... 526/318.6, 318.25, 526/324, 329.2, 347; 528/501, 503; 430/109.3, 137.15, 910; 428/402

(56) References Cited

U.S. PATENT DOCUMENTS

| | | | | |
|---|---|---|---|---|
| 5,009,978 A | * | 4/1991 | Yoshida et al. | |
| 5,024,914 A | * | 6/1991 | Funato et al. | |
| 5,071,918 A | * | 12/1991 | Funato et al. | |
| 5,204,413 A | * | 4/1993 | Funato et al. | |
| 5,227,273 A | * | 7/1993 | Yoshida et al. | |
| 5,409,989 A | * | 4/1995 | Ito et al. | |
| 5,447,813 A | | 9/1995 | Hagiwara et al. | |
| 5,518,848 A | * | 5/1996 | Ito et al. | |
| 5,521,268 A | * | 5/1996 | Ghyzel et al. | 526/224 |
| 5,595,849 A | * | 1/1997 | Niinae | 430/109.5 |
| 5,674,962 A | * | 10/1997 | Ito et al. | |

FOREIGN PATENT DOCUMENTS

| | | |
|---|---|---|
| JP | 58-37651 | 3/1983 |
| JP | 64-70765 | 3/1989 |
| JP | 1-219764 | 9/1989 |
| JP | 3-85547 | 4/1991 |
| JP | WO 91/10171 | 7/1991 |
| JP | 3-223768 | 10/1991 |
| JP | 5-66613 | 3/1993 |
| JP | 5-204187 | 8/1993 |
| JP | 5-249733 | 9/1993 |
| JP | 5-333596 | 12/1993 |
| JP | 06266157 A | 9/1994 |
| JP | 7-49588 | 2/1995 |
| JP | 07120971 A | 5/1995 |
| JP | 7-120972 | 5/1995 |
| JP | 07209906 A | 8/1995 |
| JP | 07295283 a | 11/1995 |
| JP | 10-10783 | 1/1998 |

OTHER PUBLICATIONS

U.S. patent application Ser. No. 08/973,552, filed Dec. 19, 1997, allowed.

* cited by examiner

*Primary Examiner*—Fred Teskin
(74) *Attorney, Agent, or Firm*—Oblon, Spivak, McClelland, Maier & Neustadt, P.C.

(57) ABSTRACT

Toner binder resins with low odor and excellent charging stability as toners, containing styrene-acrylic copolymers or mixtures thereof, wherein the total content of volatile components is no greater than about 1,500 ppm, the content of volatile components with benzene rings is no greater than about 1,400 ppm, and the content of volatile components with benzene rings and boiling point of below about 200° C. is no greater than about 500 ppm.

32 Claims, No Drawings

TONER BINDER RESIN AND PROCESS FOR THE PRODUCTION THEREOF

This application is a continuation of PCT/JP98/04844, filed Oct. 26, 1998.

BACKGROUND OF THE INVENTION

1. Field of the Invention

The present invention relates to a toner binder resin used for the development of electrostatic charge images or magnetic latent images in electrophotographic methods, electrostatic recording methods, and electrostatic printing methods, for example, and to a process for its production. The toner binder resin of the present invention has, in particular, a low odor and excellent charging stability.

2. Description of the Background

A typical image-forming process in electrophotographic methods and electrostatic printing methods entails: i) a photoconductive insulating layer is uniformly charged in a developing step, ii) the insulating layer is exposed to light, iii) the charge on the exposed sections is then dissipated to form an electrical latent image, iv) a charged fine powder toner is adhered to the latent image for visualization, v) the obtained visible image is transferred to a transfer material, such as transfer paper, and vi) heat or pressure is used for permanent fixing in a fixing step.

The toner and the toner binder resin used for the electrophotographic method or electrostatic printing method must exhibit various degrees of performance for each of these steps. For example, for adhesion of the toner to the electrical latent image in the developing step, the toner and the toner binder resin must hold a charge suitable for copy machines without being affected by the surrounding environment, including, for example, such as the temperature and humidity. Also, in the fixing step with a hot roller fixing system, it is essential to have a satisfactory non-offset property to avoid adhesion onto the hot roller and a satisfactory fixing property onto the paper. In addition, the toner must have blocking resistance to avoid blocking while being stored in the copy machine.

For copy machines, printers, or facsimiles, for example, used for electrophotographic methods, electrostatic recording methods and electrostatic printing methods, a hot roller is usually used, at a temperature of about 100–230° C., for fixing the toner onto the paper. In this fixing step, multiple sheets are generally fixed one after another, and the toner accumulates on the hot roller in trace amounts that do not affect the non-offset property. The temperature of the hot roller increases because of continuous rotation or continuous sheet feeding, and heating of the toner accumulated on the hot roller causes volatilization of residual monomers and residual solvent present in the toner, thus producing an odor. In recent years, with the increased application of electrophotographic methods, the popularity of copy machines, printers and facsimiles has grown and their use in closed-in offices and homes has increased. Accordingly, there has been a demand for reduced odors during image formation and image fixing, as well as a strong demand for odor reduction even for toner production where the binder resin and other additives are kneaded with a kneader, or extruder, for example.

In the past, styrene-acrylic copolymers have been often used as toner binder resins and, because the problem of odor is caused by residual monomers and residual solvent in the toner binder resin, efforts have been made to reduce the residual monomer and residual solvent in the binder resin.

For reduction of the residual monomers and residual solvent in the binder resin, there have been proposed methods, such as one for achieving low odor by heating the polymerized resin to a temperature above its glass transition temperature and distilling off a prescribed amount of moisture to reduce the residual monomers, as described in Japanese Unexamined Patent Publication No. 1-70765, for example. In Japanese Unexamined Patent Publication No. 7-104514 and Japanese Unexamined Patent Publication No. 8-41123 as well, there are proposed methods of suppressing odor by reducing the volatile components, such as residual monomers and residual solvent. Japanese Unexamined Patent Publication No. 3- 101745 and Japanese Unexamined Patent Publication No. 3-101746 also propose methods designed to minimize odor by reducing the benzaldehyde contained in the toner binder resin.

However, although the method described in Japanese Unexamined Patent Publication No. 1-70765 allows efficient reduction of the volatile components with a boiling point of under 150° C., removal of the volatile components of higher boiling points is difficult, and, therefore, it has not been possible to achieve adequate odor reduction. In methods which distill off prescribed amounts of moisture, the processing stability sometimes undergoes extreme deterioration, and the content of resin particles with a particle size exceeding 1,000 μm sometimes reaches about 5%, thus leading to the problem of a reduced charging property of the toner. The methods described in Japanese Unexamined Patent Publication No. 1-70765, No. 7-104514 and No. 8-41123 merely reduce the monomers and solvents remaining in the resin after polymerization, and are not particularly concerned with the other volatile components that cause odors. Consequently, adequate odor reduction has yet to be achieved. Moreover, even the methods described in Japanese Unexamined Patent Publication No. 3-101745 and No. 3-101746, while achieving reduction in benzaldehyde, do not succeed in satisfactorily removing the other volatile components and have therefore not achieved adequate odor reduction.

SUMMARY OF THE INVENTION

Accordingly, it is an object of the present invention to provide a toner binder resin with low odor and excellent charging stability as a toner, as well as a process for its production.

It is, in particular, an object of the present invention to provide a toner binder resin, containing a styrene-acrylic copolymer or a mixture thereof, wherein the total content of volatile components is no greater than about 1,500 ppm, the content of volatile components with benzene rings is no greater than about 1,400 ppm, and the content of volatile components with benzene rings and a boiling point of below 200° C. is no greater than about 500 ppm.

DETAILED DESCRIPTION OF THE PREFERRED EMBODIMENTS

The present invention is predicated, in part, on the surprising discovery that the problem of odor is not caused merely by the residual monomers, residual solvent or benzaldehyde contained in binder resins, but that toners with low odor can also be obtained by reducing the other volatile components as well, to obtain toner binder resins also exhibiting excellent charging stability as toners. The present invention has surprisingly reached this result.

That is, the toner binder resin of the present invention contains a styrene-acrylic copolymer or a mixture thereof, wherein the total content of volatile components is no greater than about 1,500 ppm, the content of volatile components with benzene rings is no greater than about 1,400 ppm, and the content of volatile components with benzene rings and a boiling point of below about 200° C. is no greater than about 500 ppm.

By limiting the toner binder resin of the invention to a total content of volatile components of no greater than about 1,500 ppm, a content of volatile components with benzene rings of no greater than about 1400 ppm and a content of volatile components with benzene rings and a boiling point of below about 200° C. of no greater than about 500 ppm, it is surprisingly possible to achieve odor reduction during image formation and image fixing when the resin is kneaded with various additives during toner production or when the toner is used for copy machines, printers, facsimiles and the like.

The toner binder resin of the present invention has a total volatile component content of no greater than about 1,500 ppm. This is because when the total volatile component content in the toner binder resin exceeds about 1,500 ppm, it is not possible to achieve odor reduction during image formation and image fixing when the resin is kneaded with various additives during toner production or the toner is used for copy machines, printers, facsimiles and the like; it is preferably in a range of no greater than about 1,000 ppm and even more preferably in a range of no greater than about 800 ppm.

The major sources of odor in toner are the volatile components with benzene rings among those volatile components in the toner binder resin and therefore, from the standpoint of reducing odor, the content of volatile components with benzene rings among the other volatile components is preferably in a range of no greater than about 1,400 ppm, more preferably a range of no greater than about 1,000 ppm, and even more preferably a range of no greater than about 800 ppm. Even among the volatile components with benzene rings, the particular causes of odor are the volatile components with a boiling point of below about 200° C., and according to the invention the content of volatile components with benzene rings and a boiling point of below about 200° C. is preferably no greater than about 500 ppm, more preferably in the range of no greater than about 450 ppm, and even more preferably in the range of no greater than 400 about ppm. According to the present invention, the volatile components with benzene rings and a boiling point of below about 200° C. include t-butoxybenzene. Further, the content of volatile components with benzene rings and a boiling point of below about 150° C., which are the most prominent cause of odor generation, is preferably in the range of no greater than about 300 ppm, more preferably no greater than about 250 ppm, even more preferably no greater than about 200 ppm, and especially no greater than log ppm.

According to the present invention, as examples of volatile components with benzene rings and boiling points of below 150 ° C., there may be mentioned benzene, toluene, ethylbenzene, p-xylene, m-xylene, o-xylene and styrene, for example. As examples of volatile components with benzene rings and boiling points from 150° C. up to 200° C., there may be mentioned cumene, n-propylbenzene, allylbenzene, diethylbenzene, a-methylstyrene, benzaldehyde, styrene oxide, methyl benzoate, and phenol, for example. As examples of volatile components with benzene rings and boiling points of 200° C. or higher there may be mentioned acetophenone, naphthalene, a-methylbenzyl alcohol, dibenzyl, benzoic acid, phenyl benzoate, and biphenyl, for example. As volatile components with no benzene rings, there may be mentioned acetone, t-butanol, butyl acetate, butyl propionate, n-butanol, 2-ethylhexyl acetate, 2-ethylhexanol and other (meth)acrylic monomers and their decomposition products, and polymerization initiator decomposition products, for example.

The toner binder resin of the present invention consists of a styrene-acrylic copolymer containing a styrene-based monomer and another copolymerizable vinyl-based monomer. According to the present invention, the styrene-based monomer used for polymerization of the high molecular weight polymer component and the low molecular weight polymer component may be styrene, α-methylstyrene, m-methylstyrene, p-methylstyrene, a-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-phenylstyrene, or 3,4-dicyclohexylstyrene, for example. However, styrene is preferred. These styrene-based monomers may be used alone or in combinations of two or more.

For the other copolymerizable vinyl-based monomer there may be mentioned unsaturated monocarboxylic acid esters such as ethyl acrylate, methyl acrylate, n-butyl acrylate, isobutyl acrylate, propyl acrylate, 2-ethylhexyl acrylate, stearyl acrylate, methacrylic acid, ethyl methacrylate, methyl methacrylate, n-butyl methacrylate, isobutyl methacrylate, propyl methacrylate, 2-ethylhexyl methacrylate and stearyl methacrylate, and unsaturated dicarboxylic acid diesters, such as dimethyl maleate, diethyl maleate, butyl maleate, dimethyl fumarate, diethyl fumarate and dibutyl fumarate, for example.

In combination there may also be used carboxylic acid-containing vinyl monomers, including unsaturated monocarboxylic acids such as acrylic acid, methacrylic acid and cinnamic acid; unsaturated dicarboxylic acids such as maleic acid, fumaric acid and itaconic acid; and unsaturated monocarboxylic acid monoesters such as monomethyl maleate, monoethyl maleate, monobutyl maleate, monomethyl fumarate, monoethyl fumarate, and monobutyl fumarate, for example.

In order to form a tetrahydrofuran-insoluble component in the toner binder resin of the present invention, there may be mentioned methods of providing a crosslinked structure with a crosslinkable monomer, or metal crosslinking; however, it is preferred to use a crosslinkable monomer to introduce a crosslinked structure into the high molecular weight polymer component. This is because when a crosslinked structure is introduced into a low molecular weight polymer component, the introduced crosslinked structure becomes fragile and tends to reduce the non-offset property of the toner.

As examples of crosslinkable monomers to be used to form the tetrahydrofuran-insoluble component there may be mentioned divinylbenzene, ethyleneglycol di(meth)acrylate, 1,3-butyleneglycol di(meth)acrylate, 1,4-butanediol di(meth)acrylate, 1,5-pentanediol di(meth)acrylate, neopentyl di(meth)acrylate, diethyleneglycol di(meth)acrylate, triethyleneglycol di(meth)acrylate, tetraethyleneglycol di(meth)acrylate, polyethyleneglycol di(meth)acrylate, dipropyleneglycol di(meth)acrylate, polypropyleneglycol di(meth)acrylate, pentaerythritol tri(meth)acrylate, trimethylolethane tri(meth)acrylate and trimethylolpropane tri (meth)acrylate, for example.

The copolymerizing proportions of these monomers are not particularly restricted, but they are preferably selected so that the glass transition temperature of the resulting toner binder resin is at least about 40° C. This is because, if the glass transition temperature of the toner binder resin is below about 40° C., the blocking temperature of the toner may be lowered and the shelf life may be drastically reduced. If the glass transition temperature of the toner binder resin is higher than about 80° C. the softening temperature will be higher tending to reduce the fixing property of the toner, and therefore it is preferably in a range of about 45–80° C., and more preferably in a range of about 50–65° C.

From the standpoint of the toner fixing property, non-offset property and charging property, it is preferred for the toner binder resin of the invention to have at least one peak in the molecular weight range of about 4,000–50,000 in a chromatogram measured by gel permeation chromatography (GPC) of the tetrahydrofuran (THF)-soluble portion, more preferably in the molecular weight range of about 5,000–45,000, and even more preferably in the molecular weight range of about 6,000–40,000.

From the viewpoint of the toner non-offset property, it is preferred to have the THF-insoluble component present in the range of about 5–55wt %, or a high molecular weight polymer component having at least one peak in the molecular weight range of about 8,000–500,000 according to GPC, present in the range of about 10–60 wt %. This is because, if the content of the THF-insoluble component is less than about 5 wt %, the melt viscosity of the toner is reduced, tending to prevent a sufficient non-offset property, while if it exceeds about 55 wt %, the melt viscosity of the toner is increased tending to reduce the fixing property, and the toner strength is increased, tending to reduce the grindability thereof. On the other hand, a high molecular weight polymer component content of less than about 10 wt % will tend to prevent a sufficient non-offset property even if the molecular weight is increased, while a content exceeding about 60 wt % will tend to reduce the fixing property of the toner.

The toner binder resin of the present invention preferably has a weight average molecular weight in the range of about 50,000–300,000, a ratio (Mw/Mn) of weight average molecular weight (Mw) and number average molecular weight (Mn) in the range of about 3–40 and a ratio (Mz/Mn) of Z average molecular weight (Mz) and number average molecular weight (Mn) in the range of about 10–300; more preferably, Mw is in the range of about 70,000–200,000, Mw/Mn is in the range of about 5–30 and Mz/Mn is in the range of about 15–250.

The toner binder resin of the present invention may be produced from a mixture of the aforementioned polymerizable monomers by a publicly known polymerization method such as suspension polymerization, solution polymerization, emulsion polymerization or bulk polymerization. Among these, polymers obtained by suspension polymerization are preferred because they have no odor due to residual solvent, and because they have improved the storability of the toner, have few very low molecular weight components with a molecular weight of under 3,000 that are causes of filming on photosensitive drums and adhesion onto fixing rolls, are more convenient for controlling heat generation, require lower usage of dispersing agents, and do not impair moisture resistance. In order to reduce the volatile components such as residual monomers, it is preferred to carry out the polymerization with two or more polymerization initiators with different half-life temperatures. When a polymerization initiator remains in the obtained resin, the polymerization initiator sometimes decomposes during kneading or storage for the toner production, generating volatile components, and therefore the polymerization is preferably followed by heat treatment with temperature increase to a high level of, for example, 110° C. or above and preferably 120° C. or above, under pressurization, and then distillation of the volatile components out of the reaction system while releasing the pressurized condition. The condition of pressurization in the reaction system may be created by applying external pressure onto the reaction system, but a reaction vessel such as an autoclave may also be used for sealing of the reaction system and heating to a desired temperature in order to create a pressurized condition.

The polymerization initiator used for suspension polymerization is not particularly restricted, and it may be a commonly used peroxide or azo-based compound with radical polymerization properties, examples of which include di-t-butyl peroxide, t-butylcumyl peroxide, dicumyl peroxide, acetyl peroxide, isobutyryl peroxide, octanonyl peroxide, decanonyl peroxide, lauroyl peroxide, 3,5,5-trimethylhexanoyl peroxide, benzoyl peroxide, m-toluoyl peroxide, t-butylperoxy acetate, t-butylperoxy isobutyrate, t-butylperoxy piperate, t-butylperoxy neodecanoate, cumylperoxy neodecanoate, t-butylperoxy-2-ethylhexanoate, t-butylperoxy-3,5,5-trimethylhexanoate, t-butylperoxy laurate, t-butylperoxy benzoate, t-butylperoxy isopropylcarbonate, azobisisobutyronitrile, 2,2-azobis(2,4-dimethylvaleronitrile), 2,2-bis(4,4-di-t-butylperoxycyclohexyl)propane, cyclohexanone peroxide, diisopropylbenzenehydroperoxide, p-methanehydroperoxide, 2-(carbamoylazo) isobutyronitrile, 2,2-azobis(2,4,4-trimethylpentane) and 2-phenylazo-2,4-dimethyl-4-methoxyvaleronitrile. These polymerization initiators may be used alone or in combinations of two or more, and are preferably used in the range of 0.1–10 parts by weight, and more preferably in the range of 0.5–10 parts by weight, to 100 parts by weight of the monomers.

The suspension polymerization is carried out by adding a dispersing agent, polymerization initiator and if necessary a dispersing aid or chain transfer agent to the monomer, preferably with a 1–10 fold amount and more preferably a 2–4 fold amount of water, raising the temperature to the prescribed polymerization temperature, and continuing the heating until the desired degree of polymerization is achieved.

As dispersing agents to be used for suspension polymerization there may be mentioned polyvinyl alcohol, alkali metal salts of simple polymers or copolymers of (meth) acrylic acid, carboxymethyl cellulose, gelatin, starch, barium sulfate, calcium sulfate, calcium carbonate, magnesium carbonate and calcium phosphate, among which polyvinyl alcohol is preferred, and most preferred is partially saponified polyvinyl alcohol wherein the acetic acid groups and hydroxyl groups are present in blocks. These dispersing agents are preferably used in the range of 0.01–5 parts by weight to 100 parts by weight of water. This is because using the dispersing agent at less than 0.01 part by weight will reduce the stability of the suspension polymerization, tending to result in solidification of the polymer by aggregation of generated particles, while at greater than 5 parts by weight the environment dependency, and especially moisture resistance of the toner will tend to be poorer; a more preferred range is 0.05–2 parts by weight. If necessary, a dispersing aid such as sodium chloride, potassium chloride, sodium sulfate or potassium sulfate may be used together with these dispersing agents. For adjustment of the molecular weight, a chain transfer agent such as n-octylmercaptane, n-dodecylmercaptane, t-dodecylmercaptane, 2-ethylhexyl thioglycolate or a-methylstyrene dimer may also be used as necessary.

The styrene-acrylic copolymer obtained in this manner preferably has a mean particle size of 100–400 μm, preferably with no more than 5% of the particles having a particle size of greater than 1,000 μm, and even more preferably the mean particle size is in a range of 110–300 μm, with no more than 2% of the particles having a particle size exceeding 1,000 μm.

This is because with a mean particle size of less than 100 μm the fluidizing properties are impaired during the premixing and kneading for toner production, thus tending to more readily induce clogging at the feeder, and tending to result in a poorer working environment due to fly-off of fine particles. Conversely, if the mean particle size exceeds 400 Am, the miscibility will be poorer with additives such as pigments and charge control agents during the premixing for toner production, thus tending to reduce the toner image density. If more than 5% of the particles have a particle size of greater than 1,000 μm, the miscibility will tend to be extremely low during the premixing for toner production.

According to the present invention, the binder resin described above may be used as a binder resin for various types of toners including two-component toners, one-component toners, magnetic toners and non-magnetic toners, and in the case of a two-component toner for example, it is preferably contained in the toner in the range of 88–97 wt %, and more preferably in the range of 90–95 wt %. This is because if the binder resin content is less than 88 wt % the non-offset property of the toner will tend to be poorer, and at greater than 97 wt % the charging stability of the toner will tend to be inferior.

The binder resin of the present invention is combined with a coloring agent, pigment, charge control agent, an offset inhibitor, magnetic particles and the like and kneaded using a kneader such as a twin-screw extruder or mixer, for example, at a high temperature of about 15–30° C. higher than the softening point of the binder resin, and then finely pulverized and sorted to obtain a toner. The resulting toner particles have a mean particle size of about 5–20 μm and preferably about 8–15 μm, with preferably less than 3 wt % of the fine particles with a particle size of smaller than 5 μm. The coloring agents, pigments, charge control agents, offset inhibitors and magnetic particles used may be such as are commonly employed, and as examples there may be mentioned coloring agents or pigments such as carbon black, nigrosine dyes, lamp black, Sudan black SM, Navel yellow, mineral fast yellow, lithol red, permanent orange 4R and the like; charge control agents such as nigrosine, alkyl group containing azine-based dyes, basic dyes, monoazo dyes and their metal complexes, salicylic acid and its metal chelates, alkylsalicylic acid and its metal chelates, and naphthoic acid and its metal chelates; offset inhibitors such as polyethylene, polypropylene and ethylenepolypropylene copolymer; and magnetic powders such as ferrite and magnetite.

The present invention will now be explained in further detail by way of reference to certain Examples, which are provided solely for purposes of illustration and are not intended to be limitative.

Quantitation of Volatile Components other than Benzene

After 1 ml of an internal standard solution prepared by diluting 0.2 g of 3-methoxy-3-methylbutanol to 100 ml with acetone was added to 1 g of resin, 15 ml of acetone was added and the mixture was allowed to stand for 39 hours. After next shaking for one hour and performing ultrasonic extraction for 30 minutes, followed by 6 hours of shaking and 68 hours of standing, the supernatant solution was taken as a measuring sample and measured using a gas chromatograph (Model GC-14B, product of Shimazu Laboratories). The pouring amount was 5 μl, with an SPWAX-10 (30 m ×0.53 mm ×1.0 μm) by SUPELCO and an SBP-5 (30 m ×0.53 mm ×1.5 μm) by SUPELCO used as columns for parallel flow. The detector was an FID (hydrogen ion detector), and He was used as the carrier gas under a pressure of 0.3 kg/cm$^2$. The pouring hole temperature was 150° C., the detector temperature was 220° C., and after 3 minutes of holding at 40° C., the temperature was raised from 40° C. to 200° C. at a rate of 6° C./min, followed by holding at 200° C. for 5 minutes.

Quantitation of Benzene

Ten milliliters of an internal standard solution prepared by first diluting 0.2 g of 3-methoxy-3-methylbutanol to 100 ml with methyl isobutyl ketone (MIBK) and then diluting 2 ml thereof to 100 ml with MIBK was added to 1 g of resin. Next, 5 ml of MIBK was added and the mixture was shaken for 2 hours and allowed to stand for 65 hours. After then performing ultrasonic extraction for 30 minutes, followed by 7 hours of shaking and 41 hours of standing, the supernatant solution was taken as a measuring sample and measured using a gas chromatograph (Model GC-14B, product of Shimazu Laboratories), under the same conditions as above.

Measurement of THF-insoluble component

The weight ($W_1$) of a glass filter (IG-3 or 2G-3) packed with Celite 545 (Katayama Chemical Co.) was measured. After then adding 50 ml of THF to about 0.5 g of resin ($W_2$) in the glass filter, the THF solution was heat treated at 60° C. for 3 hours and then subjected to filtration under suction. The THF-insoluble component remaining on the glass filter was thoroughly washed off with acetone, and the glass filter packed with Celite 545 was vacuum dried at 80° C. for over 3 hours. The weight ($W_3$) of the dried glass filter packed with Celite 545 was measured and the following calculation was performed. THF-insoluble component (wt%) $=\{(W_3-W_1)/W_2\}\times 100$

Molecular weight distribution by gel permeation chromatography

A 0.04 wt % resin solution with THF as the solvent was filtered with a PTFE film (Maishori Disk H-25-5, product of Toso Company), and measured at a temperature of 38° C. using a gel permeation chromatography apparatus (HCL-8020, product of Toso Company) comprising 3 columns (TSKgel/GMH$_{XL}$ columns, product of Toso Company), and this parameter was determined in terms of polystyrene with a calibration curve using F2000/F700/F288/F128/F80/F40/F20/F2/A1000 (polystyrene, product of Toso Company) and styrene monomer. The measuring temperature was 38° C., and the detector was an RI.

Glass transition temperature

The sample was heated to 100° C. for melt quenching, and this parameter was determined by DSC (temperature elevating rate of 10° C./min).

Softening temperature

A flow tester (CFT-500, product of Shimazu Laboratories) with a 1 mmφ×10 mm nozzle was used, and the temperature was recorded at which ½ of the sample flowed out under conditions with a 30 kgf load and a temperature elevating rate of 3° C./min.

Fixing temperature zone

An unfixed image obtained from a copy machine (GP-1570, product of Panasonic) was used for fixation of a toner image at a fixing rate of 150 mm/see with a fixing tester with a variable-temperature roller, the fixed toner image was rubbed nine times with a sand eraser (JIS 512), and the image density before and after this was measured with a Macbeth densitometer and were represented in terms of the minimum temperature at which the density reduction was less than 20% (minimum fixing temperature) and the minimum temperature at which the toner migrated to the roller (maximum fixing temperature).

Image fogging

The white areas of the image obtained for evaluation of the fixing temperature zone were visually observed and evaluated on the following scale. ○: no problems Δ: some problems, but practically usable ×: not practical Odor of resin A 10 g portion of resin was placed in a 200 cc sealed glass vessel and heated at 180° C. for one hour, and then the odor of the resin during heating was evaluated on the following scale. ○: almost no odor Δ: some odor ×: odor Odor of toner A copy machine (GP-1570, product of Panasonic) was set up in the center of an approximately 32 m2 room and used for solid printing of 10 sheets, after which an organoleptic test was conducted with 10 randomly selected persons. For the organoleptic test, 0 points were ascribed when absolutely no odor was sensed, 1 point was ascribed when some odor was sensed but it was not disagreeable, and 2 points were ascribed when odor was sensed and was disagreeable; the evaluation was on the following scale based on the total points from the 10 evaluators. ○: 0–5 points Δ: 5–10 points ×: 11–20 points Resin particle size The mean particle size was determined by sieving a 500 g sample with a shaker equipped with a sieve of 1000 μm, 710 μm, 500 μm, 355 μm, 250 μm, 150 μm or 75 μm mesh in that order, and indicating the value for 50 wt % accumulation of the particle size distribution. The amount of particles with a particle size of 1000 μm or greater was determined by measuring the mass of particles remaining on the 1,000 μm mesh sieve, and dividing the number of grams by 500.

EXAMPLE 1

A mixed solution of 200 parts by weight of deionized water and 0.2 part by weight of partially saponified polyvinyl alcohol (Gosenol GH-23, product of Nippon Gosei Kagaku Kogyo) was loaded into a 4-liter autoclave. Next, 3 parts by weight of benzoyl peroxide as a polymerization initiator was dissolved in a monomer mixture comprising 74 parts by weight of styrene, 26 parts by weight of n-butyl acrylate and 0.315 part by weight of divinylbenzene, and the mixture was loaded into the autoclave while stirring. The reaction system was then sealed and heated to 85° C. and held for 4 hours for suspension polymerization, followed by heat treatment by temperature increase to 130° C. over a period of 30 minutes, and the pressure in the reaction system was gradually released while distilling the volatile components out of the system for 10 minutes through a condenser. Cooling to room temperature was followed by thorough washing, dewatering and drying to obtain a styrene-acrylic copolymer. Table 1 shows the results from measuring the glass transition temperature, softening temperature, THF-insoluble component content, THF-soluble portion molecular weight distribution peak, weight average molecular weight (Mw), ratio (Mw/Mn) of weight average molecular weight (Mw) and number average molecular weight (Mn), ratio (Mz/Mn) of Z average molecular weight (Mz) and number average molecular weight (Mn) and particle size of the obtained styrene-acrylic copolymer, as well as the odor evaluation results. Table 2 shows the measurement results for the volatile components.

To 93 parts by weight of the obtained styreneacrylic copolymer as a binder resin there were added 4 parts by weight of carbon black (#40, product of Mitsubishi Chemicals), 1 part by weight of a charge control agent (Bonbon S-34, product of Orient Chemical Industries) and 2 parts by weight of polypropylene wax (660P, product of Sanyo Chemicals), and a twin-screw extruder was used for about 5 minutes of melt kneading at 150° C. A jet mill pulverizer was then used for pulverization, and the particles were sorted to obtain toner with a mean particle size of 13 μm. Table 3 shows the fixing temperature zone, image fogging and odor evaluation results for the obtained toner.

EXAMPLE 2

A mixed solution of 200 parts by weight of deionized water and 0.2 part by weight of partially saponified polyvinyl alcohol (Gosenol GH-23, product of Nippon Gosei Kagaku Kogyo) was loaded into a 4-liter autoclave. Next, 3 parts by weight of benzoyl peroxide as a polymerization initiator was dissolved in a monomer mixture comprising 74 parts by weight of styrene, 26 parts by weight of n-butyl acrylate and 0.315 part by weight of divinylbenzene, and the mixture was loaded into the autoclave while stirring. The reaction system was then sealed and heated to 85° C. for suspension polymerization for 4 hours, followed by heat treatment by temperature increase to 130° C. over a period of 30 minutes, and the reaction system pressure was gradually released while distilling the volatile components out of the system for 30 minutes through a condenser. Cooling to room temperature was followed by thorough washing, dewatering and drying to obtain a styrene-acrylic copolymer. Table 1 shows the results from measuring the glass transition temperature, softening temperature, THF-insoluble component content, THF-soluble portion molecular weight distribution peak, weight average molecular weight (Mw), ratio (Mw/Mn) of weight average molecular weight (Mw) and number average molecular weight (Mn), ratio (Mz/Mn) of Z average molecular weight (Mz) and number average molecular weight (Mn) and particle size of the obtained styrene-acrylic copolymer, as well as the odor evaluation results. Table 2 shows the measurement results for the volatile components.

To 93 parts by weight of the obtained styreneacrylic copolymer as a binder resin there were added 4 parts by weight of carbon black (#40, product of Mitsubishi Chemicals), 1 part by weight of a charge control agent (Bonbon S-34, product of Orient Chemical Industries) and 2 parts by weight of polypropylene wax (660P, product of Sanyo Chemicals), and a twin-screw extruder was used for about 5 minutes of melt kneading at 150° C. A jet mill pulverizer was then used for pulverization, and the particles were sorted to obtain toner with a mean particle size of 13 μm. Table 3 shows the fixing temperature zone, image fogging and odor evaluation results for the obtained toner.

EXAMPLE 3

A mixed solution of 200 parts by weight of deionized water and 0.2 part by weight of partially saponified polyvinyl alcohol (Gosenol GH-23, product of Nippon Gosei Kagaku Kogyo) was loaded into a 4-liter autoclave. Next, 3 parts by weight of benzoyl peroxide as a polymerization initiator was dissolved in a monomer mixture comprising 74 parts by weight of styrene, 26 parts by weight of n-butyl acrylate and 0.315 part by weight of divinylbenzene, and the mixture was loaded into the autoclave while stirring. The reaction system was then sealed and heated to 85° C. for suspension polymerization for 4 hours, followed by heat treatment by temperature increase to 130° C. over a period of 30 minutes, and the reaction system pressure was gradually released while distilling the volatile components out of the system for 60 minutes through a condenser. Cooling to room temperature was followed by thorough washing, dewatering and drying to obtain a styrene-acrylic copolymer. Table 1 shows the results from measuring the glass transition temperature, softening temperature, THF-insoluble component content, THF-soluble portion molecular weight distribution peak, weight average molecular weight (Mw), ratio (Mw/Mn) of weight average molecular weight (Mw) and number average molecular weight (Mn), ratio (Mz/Mn) of Z average molecular weight (Mz) and number average molecular weight (Mn) and particle size of the obtained styrene-acrylic copolymer, as well as the odor evaluation results. Table 2 shows the measurement results for the volatile components.

To 93 parts by weight of the obtained styreneacrylic copolymer as a binder resin there were added 4 parts by weight of carbon black (#40, product of Mitsubishi Chemicals), I part by weight of a charge control agent (Bonbon S-34, product of Orient Chemical Industries) and 2 parts by weight of polypropylene wax (660P, product of Sanyo Chemicals), and a twin-screw extruded was used for about 5 minutes of melt kneading at 140° C. A jet mill pulverizer was then used for pulverization, and the particles were sorted to obtain toner with a mean particle size of 13 μm. Table 3 shows the fixing temperature zone, image fogging and odor evaluation results for the obtained toner.

EXAMPLE 4

A mixed solution of 200 parts by weight of deionized water and 0.2 part by weight of partially saponified polyvinyl alcohol (Gosenol GH-23, product of Nippon Gosei Kagaku Kogyo) was loaded into a 4-liter autoclave. Next, 3.5 parts by weight of benzoyl peroxide and 0.5 part by weight of t-butylperoxy benzoate as polymerization initiators were dissolved in a monomer mixture comprising 75 parts by weight of styrene, 25 parts by weight of n-butyl acrylate and 0.3 part by weight of divinylbenzene, and the mixture was loaded into the autoclave while stirring. The reaction system was then sealed and heated to 85° C. for suspension polymerization for 4 hours, followed by heat treatment by temperature increase to 130° C. over a period of 30 minutes, and the reaction system pressure was gradually released while distilling the volatile components out of the system for 90 minutes through a condenser. Cooling to room temperature was followed by thorough washing, dewatering and drying to obtain a styrene-acrylic copolymer. Table 1 shows the results from measuring the glass transition temperature, softening temperature, THF-insoluble portion content, THF-soluble component molecular weight distribution peak, weight average molecular weight (Mw), ratio (Mw/Mn) of weight average molecular weight (Mw) and number average molecular weight (Mn), ratio (Mz/Mn) of Z average molecular weight (Mz) and number average molecular weight (Mn) and particle size of the obtained styrene-acrylic copolymer, as well as the odor evaluation results. Table 2 shows the measurement results for the volatile components.

To 93 parts by weight of the obtained styreneacrylic copolymer as a binder resin there were added 4 parts by weight of carbon black (#40, product of Mitsubishi Chemicals), 1 part by weight of a charge control agent (Bonbon S-34, product of Orient Chemical Industries) and 2 parts by weight of polypropylene wax (660P, product of Sanyo Chemicals), and a twin-screw extruder was used for about 5 minutes of melt kneading at 140° C. A jet mill pulverizer was then used for pulverization, and the particles were sorted to obtain toner with a mean particle size of 13 am. Table 3 shows the fixing temperature zone, image fogging and odor evaluation results for the obtained toner.

EXAMPLE 5

A mixed solution of 200 parts by weight of deionized water and 0.2 part by weight of partially saponified polyvinyl alcohol (Gosenol GH-23, product of Nippon Gosei Kagaku Kogyo) was loaded into a 4-liter autoclave. Next, 0.024 part by weight of 2,2-bis(4,4-di-tbutylperoxycyclohexyl)propane (Perkadox 12, product of Kayaku Akuzo Co.) as a polymerization initiator was dissolved in a monomer mixture comprising 32.5 parts by weight of styrene, 7.5 parts by weight of n-butyl acrylate and 0.02 part by weight of divinylbenzene, and the mixture was loaded into the autoclave while stirring. The reaction system was then sealed and heated to 130° C. for 2 hours for suspension polymerization of the high molecular weight polymer components. After cooling this suspension of high molecular weight polymer components to 40° C., there was added a mixed solution of 56 parts by weight of styrene, 4 parts by weight of n-butyl acrylate, 6 parts by weight of benzoyl peroxide and 1 part by weight of t-butylperoxy benzoate, and the reaction system was then sealed and heated to 130° C. and held for 2 hours for suspension polymerization of the low molecular weight polymer components. Next, the reaction system pressure was gradually released while distilling the volatile components out of the system for 60 minutes through a condenser. Cooling to room temperature was followed by thorough washing, dewatering and drying to obtain a styrene-acrylic copolymer. Table I shows the results from measuring the glass transition temperature, softening temperature, THF-insoluble component content, THF-soluble portion molecular weight distribution peak, weight average molecular weight (Mw), ratio (Mw/Mn) of weight average molecular weight (Mw) and number average molecular weight (Mn), ratio (Mz/Mn) of Z average molecular weight (Mz) and number average molecular weight (Mn) and particle size of the obtained styrene-acrylic copolymer, as well as the odor evaluation results. Table 2 shows the measurement results for the volatile components.

To 93 parts by weight of the obtained styreneacrylic copolymer as a binder resin there were added 4 parts by weight of carbon black (#40, product of Mitsubishi Chemicals), 1 part by weight of a charge control agent (Bonbon S-34, product of Orient Chemical Industries) and 2 parts by weight of polypropylene wax (660P, product of Sanyo Chemicals), and a twin-screw extruder was used for about 5 minutes of melt kneading at 150° C. A jet mill pulverizer was then used for pulverization, and the particles were sorted to obtain toner with a mean particle size of 13

μm. Table 3 shows the fixing temperature zone, image fogging and odor evaluation results for the obtained toner.

EXAMPLE 6

A mixed solution of 200 parts by weight of deionized water and 0.2 part by weight of partially saponified polyvinyl alcohol (Gosenol GH-23, product of Nippon Gosei Kagaku Kogyo) was loaded into a 4-liter autoclave. Next, 0.018 part by weight of 2,2-bis(4,4-di-t-butylperoxycyclohexyl)propane (Perkadox 12, product of Kayaku Akuzo Co.) as a polymerization initiator was dissolved in a monomer mixture comprising 24 parts by weight of styrene and 6 parts by weight of n-butyl acrylate, and the mixture was loaded into the autoclave while stirring. The reaction system was then sealed and heated to 130° C. and held for 2 hours for suspension polymerization of the high molecular weight polymer components. After cooling this suspension of high molecular weight polymer components to 40° C., there was added a mixed solution of 65 parts by weight of styrene, 5 parts by weight of n-butyl acrylate, 6 parts by weight of benzoyl peroxide and 1 part by weight of t-butylperoxy benzoate, and the reaction system was then sealed and heated to 130° C. for 2 hours for suspension polymerization of the low molecular weight polymer components. Next, the reaction system pressure was gradually released while distilling the volatile components out of the system for 90 minutes through a condenser. Cooling to room temperature was followed by thorough washing, dewatering and drying to obtain a styrene-acrylic copolymer. Table 1 shows the results from measuring the glass transition temperature, softening temperature, THF-insoluble component content, THF-soluble portion molecular weight distribution peak, weight average molecular weight (Mw), ratio (Mw/Mn) of weight average molecular weight (Mw) and number average molecular weight (Mn), ratio (Mz/Mn) of Z average molecular weight (Mz) and number average molecular weight (Mn) and particle size of the obtained styrene-acrylic copolymer, as well as the odor evaluation results. Table 2 shows the measurement results for the volatile components.

To 93 parts by weight of the obtained styreneacrylic copolymer as a binder resin there were added 4 parts by weight of carbon black (#40, product of Mitsubishi Chemicals), 1 part by weight of a charge control agent (Bonbon S-34, product of Orient Chemical Industries) and 2 parts by weight of polypropylene wax (660P, product of Sanyo Chemicals), and a twin-screw extruder was used for about 5 minutes of melt kneading at 150° C. A jet mill pulverizer was then used for pulverization, and the particles were sorted to obtain toner with a mean particle size of 13 am. Table 3 shows the fixing temperature zone, image fogging and odor evaluation results for the obtained toner.

Comparative Example 1

A mixed solution of 200 parts by weight of deionized water and 0.2 part by weight of partially saponified polyvinyl alcohol (Gosenol GH-23, product of Nippon Gosei Kagaku Kogyo) was loaded into a 4-liter autoclave. Next, 3 parts by weight of benzoyl peroxide as a polymerization initiator was dissolved in a monomer mixture comprising 74 parts by weight of styrene, 26 parts by weight of n-butyl acrylate and 0.315 part by weight of divinylbenzene, and the mixture was loaded into the autoclave while stirring. The reaction system was then sealed and heated to 85° C. and held for 4 hours for suspension polymerization, followed by cooling to room temperature and thorough washing, dewatering and drying to obtain a styrene-acrylic copolymer. Table 1 shows the results from measuring the glass transition temperature, softening temperature, THF-insoluble component content, THF-soluble portion molecular weight distribution peak, weight average molecular weight (Mw), ratio (Mw/Mn) of weight average molecular weight (Mw) and number average molecular weight (Mn), ratio (Mz/Mn) of Z average molecular weight (Mz) and number average molecular weight (Mn) and particle size of the obtained styrene-acrylic copolymer., as well as the odor evaluation results. Table 2 shows the measurement results for the volatile components.

To 93 parts by weight of the obtained styreneacrylic copolymer as a binder resin there were added 4 parts by weight of carbon black (#40, product of Mitsubishi Chemicals), 1 part by weight of a charge control agent (Bonbon S-34, product of Orient Chemical Industries) and 2 parts by weight of polypropylene wax (660P, product of Sanyo Chemicals), and a twin-screw extruder was used for about 5 minutes of melt kneading at 150° C. A jet mill pulverizer was then used for pulverization, and the particles were sorted to obtain toner with a mean particle size of 13 am. Table 3 shows the fixing temperature zone, image fogging and odor evaluation results for the obtained toner.

Comparative Example 2

A mixed solution of 200 parts by weight of deionized water and 0.2 part by weight of partially saponified polyvinyl alcohol (Gosenol GH-23, product of Nippon Gosei Kagaku Kogyo) was loaded into a 4-liter autoclave. Next, 3 parts by weight of benzoyl peroxide as a polymerization initiator was dissolved in a monomer mixture comprising 74 parts by weight of styrene, 26 parts by weight of n-butyl acrylate and 0.315 part by weight of divinylbenzene, and the mixture was loaded into the autoclave while stirring. The reaction system was then sealed and heated to 85° C. and held for 4 hours for suspension polymerization, and the temperature was raised to 130° C. and held for 120 minutes. This was followed by cooling to room temperature and thorough washing, dewatering and drying to obtain a styrene-acrylic copolymer. Table 1 shows the results from measuring the glass transition temperature, softening temperature, THF insoluble component content, THF-soluble portion molecular weight distribution peak, weight average molecular weight (Mw), ratio (Mw/Mn) of weight average molecular weight (Mw) and number average molecular weight (Mn), ratio (Mz/Mn) of Z average molecular weight (Mz) and number average molecular weight (Mn) and particle size of the obtained styrene-acrylic copolymer, as well as the odor evaluation results. Table 2 shows the measurement results for the volatile components.

To 93 parts by weight of the obtained styreneacrylic copolymer as a binder resin there were added 4 parts by weight of carbon black (#40, product of Mitsubishi Chemicals), 1 part by weight of a charge control agent (Bonbon S-34, product of Orient Chemical Industries) and 2 parts by weight of polypropylene wax (660P, product of Sanyo Chemicals), and a twin-screw extruder was used for about 5 minutes of melt kneading at 150° C. A jet mill pulverizer was then used for pulverization, and the particles were sorted to obtain toner with a mean particle size of 13 μm. Table 3 shows the fixing temperature zone, image fogging and odor evaluation results for the obtained toner.

Comparative Example 3

A mixed solution of 300 parts by weight of deionized water and 0.2 part by weight of partially saponified polyvinyl alcohol (Gosenol GH-23, product of Nippon Gosei Kagaku Kogyo) was loaded into a 4-liter glass flask. Next, 3 parts by weight of benzoyl peroxide as a polymerization initiator was dissolved in a monomer mixture comprising 74 parts by weight of styrene, 26 parts by weight of n-butyl acrylate and 0.315 part by weight of divinylbenzene, and the mixture was loaded into the glass flask while stirring. This was heated to 85° C. and held for 4 hours for suspension polymerization, followed by temperature increase to 103° C. to distill water out of the system through a condenser over a period of 120 minutes, in an amount of 20 wt % with respect to the water content at the end of polymerization. Cooling to room temperature was followed by thorough washing, dewatering and drying to obtain a styrene-acrylic copolymer. Table 1 shows the results from measuring the glass transition temperature, softening temperature, THF-insoluble component content, THF-soluble portion molecular weight distribution peak, weight average molecular weight (Mw), ratio (Mw/Mn) of weight average molecular weight (Mw) and number average molecular weight (Mn), ratio (Mz/Mn) of z average molecular weight (Mz) and number average molecular weight (Mn) and particle size of the obtained styrene-acrylic copolymer, as well as the odor evaluation results. Table 2 shows the measurement results for the volatile components.

To 93 parts by weight of the obtained styreneacrylic copolymer as a binder resin there were added 4 parts by weight of carbon black (#40, product of Mitsubishi Chemicals), 1 part by weight of a charge control agent (Bonbon S-34, product of Orient Chemical Industries) and 2 parts by weight of polypropylene wax (660P, product of Sanyo Chemicals), and a twin-screw extruder was used for about 5 minutes of melt kneading at 150° C. A jet mill pulverizer was then used for pulverization, and the particles were sorted to obtain toner with a mean particle size of 13 μm. Table 3 shows the fixing temperature zone, image fogging and odor evaluation results for the obtained toner.

Comparative Example 4

A mixed solution of 300 parts by weight of deionized water and 0.2 part by weight of partially saponified polyvinyl alcohol (Gosenol GH-23, product of Nippon Gosei Kagaku Kogyo) was loaded into a 4-liter glass flask. Next, 3 parts by weight of benzoyl peroxide as a polymerization initiator was dissolved in a monomer mixture comprising 74 parts by weight of styrene, 26 parts by weight of n-butyl acrylate and 0.315 part by weight of divinylbenzene, and the mixture was loaded into the glass flask while stirring. This was heated to 85° C. and held for 4 hours for suspension polymerization, followed by temperature increase to 103° C. to distill water out of the system through a condenser over a period of 480 minutes, in an amount of 50 wt % with respect to the water content at the end of polymerization. Cooling to room temperature was followed by thorough washing, dewatering and drying to obtain a styrene-acrylic copolymer. Table 1 shows the results of measuring the glass transition temperature, softening temperature, THF-insoluble component content, THF-soluble portion molecular weight distribution peak, weight average molecular weight (Mw), ratio (Mw/Mn) of weight average molecular weight (Mw) and number average molecular weight (Mn), ratio (Mz/Mn) of Z average molecular weight (Mz) and number average molecular weight (Mn) and particle size of the obtained styrene-acrylic copolymer, as well as the odor evaluation results. Table 2 shows the measurement results for the volatile components.

To 93 parts by weight of the obtained styreneacrylic copolymer as a binder resin there were added 4 parts by weight of carbon black (#40, product of Mitsubishi Chemicals), 1 part by weight of a charge control agent (Bonbon S-34, product of Orient Chemical Industries) and 2 parts by weight of polypropylene wax (660P, product of Sanyo Chemicals), and a twin-screw extruder was used for about 5 minutes of melt kneading at 1 50° C. A jet mill pulverizer was then used for pulverization, and the particles were sorted to obtain toner with a mean particle size of 13 μm. Table 3 shows the fixing temperature zone, image fogging and odor evaluation results for the obtained toner.

Comparative Example 5

After dissolving 3 parts by weight of benzoyl peroxide as a polymerization initiator in a monomer mixture comprising 74 parts by weight of styrene, 26 parts by weight of n-butyl acrylate and 0.315 part by weight of divinylbenzene, a solution of 0.2 part by weight of partially saponified polyvinyl alcohol (Gosenol GH-23, product of Nippon Gosei Kagaku Kogyo) in 270 parts by weight of deionized water was added thereto to make a suspended dispersion. Next, 30 parts by weight of deionized water was loaded into a 4-liter glass flask, nitrogen was introduced through a nitrogen introduction tube, and nitrogen was allowed to flow in at a temperature of 40–45° C. until the dissolved oxygen concentration reached 1.3 mg/l (as measured using a YSI DO meter, product of Nikkaki Co.). Under these conditions, the suspended dispersion obtained above was added to the glass flask and was heated to 85° C. and held for 4 hours for suspension polymerization, followed by temperature increase to 103° C. to distill water out of the system through a condenser over a period of 480 minutes, in an amount of 50 wt % with respect to the water content at the end of polymerization. Cooling to room temperature was then followed by thorough washing, dewatering and drying to obtain a styrene-acrylic copolymer. Table 1 shows the results of measuring the glass transition temperature, softening temperature, THF-insoluble component content, THF-soluble portion molecular weight distribution peak, weight average molecular weight (Mw), ratio (Mw/Mn) of weight average molecular weight (Mw) and number average molecular weight (Mn), ratio (Mz/Mn) of Z average molecular weight (Mz) and number average molecular weight (Mn) and particle size of the obtained styrene-acrylic copolymer, as well as the odor evaluation results. Table 2 shows the measurement results for the volatile components.

To 93 parts by weight of the obtained styreneacrylic copolymer as a binder resin there were added 4 parts by weight of carbon black (#40, product of Mitsubishi Chemicals), 1 part by weight of a charge control agent (Bonbon S-34, product of Orient Chemical Industries) and 2 parts by weight of polypropylene wax (660P, product of Sanyo Chemicals), and a twin-screw extruder was used for about 5 minutes of melt kneading at 150° C. A jet mill pulverizer was then used for pulverization, and the particles were sorted to obtain toner with a mean particle size of 13 μm. Table 3 shows the fixing temperature zone, image fogging and odor evaluation results for the obtained toner.

TABLE 1

| | Glass Transition Temperature (° C.) | Softening Temperature (° C.) | THF-insoluble component (wt %) | GPC peak molecular weight | Weight-average molecular weight (Mw) | Mw/Mn | Mz/Mn | Mean particle size (μm) | Particles ≧ 1000μ | Odor |
|---|---|---|---|---|---|---|---|---|---|---|
| Example 1 | 54 | 153 | 39.4 | 34,000 | 101,000 | 5.4 | 20.0 | 250 | 0.5 | Δ |
| Example 2 | 54 | 154 | 41.5 | 34,000 | 100,000 | 5.2 | 19.3 | 250 | 0.8 | ○ |
| Example 3 | 54 | 153 | 38.1 | 34,000 | 102,000 | 5.8 | 22.8 | 250 | 1.4 | ○ |
| Example 4 | 54 | 136 | 14.3 | 1,550,000, 32,000 | 169,000 | 22.2 | 116.3 | 250 | 2.1 | ○ |
| Example 5 | 61 | 138 | 11.8 | 1,600,000, 150,000, 8000 | 100,000 | 21.0 | 207.2 | 278 | 1.8 | ○ |
| Example 6 | 61 | 125 | 0.2 | 180,000, 8000 | 82,000 | 18.0 | 115.2 | 257 | 2.8 | ○ |
| Comp. Ex. 1 | 53 | 150 | 37.8 | 34,000 | 100,000 | 5.5 | 20.8 | 250 | 0.4 | x |
| Comp. Ex. 2 | 54 | 153 | 38.7 | 34,000 | 101,000 | 5.4 | 20.0 | 250 | 2.0 | x |
| Comp. Ex. 3 | 54 | 153 | 39.0 | 34,000 | 100,000 | 5.0 | 19.1 | 280 | 4.6 | x |
| Comp. Ex. 4 | 54 | 153 | 39.4 | 33,000 | 100,000 | 5.0 | 19.1 | 330 | 6.8 | x |
| Comp. Ex. 5 | 55 | 155 | 41.1 | 33,000 | 100,000 | 5.0 | 18.9 | 400 | 8.0 | x |

TABLE 2

| | Examples (ppm) | | | | | | | | | | |
|---|---|---|---|---|---|---|---|---|---|---|---|
| Volatile components | 1 | 2 | 3 | 4 | 5 | 6 | 1 | 2 | 3 | 4 | 5 |
| Benzene | 19 | 10 | — | — | — | — | 110 | 180 | 48 | — | — |
| Toluene | — | — | — | — | — | — | — | — | — | — | — |
| Ethylbenzene | 14 | — | — | — | 17 | — | 59 | 68 | 43 | 27 | 33 |
| p-Xylene | 15 | 8 | — | — | 18 | — | 35 | 39 | 29 | 21 | 31 |
| m-Xylene | 58 | 23 | 10 | — | 44 | 6 | 260 | 257 | 180 | 94 | 91 |
| o-Xylene | 52 | 22 | 13 | 5 | 45 | 5 | 136 | 127 | 111 | 98 | 95 |
| Styrene | 62 | 12 | — | — | 35 | — | 197 | 158 | 105 | 65 | 52 |
| Cumene | 40 | 26 | 20 | — | 25 | 7 | 88 | 85 | 80 | 72 | 86 |
| n-Propylbenzene | 11 | 7 | — | — | 5 | — | 38 | 45 | 29 | 22 | 36 |
| Allylbenzene | — | — | — | — | — | — | — | — | — | — | — |
| Diethylbenzene | — | — | — | — | — | — | — | — | — | — | — |
| α-Methylstyrene | — | — | — | — | — | — | — | — | — | — | — |
| Benzaldehyde | 147 | 104 | 80 | 67 | 134 | 74 | 280 | 324 | 233 | 200 | 53 |
| Styrene oxide | — | — | — | — | — | — | — | — | — | — | — |
| Methyl benzoate | — | — | — | — | — | — | — | — | — | — | — |
| Phenol | — | — | — | — | — | — | 18 | 23 | 19 | 20 | 28 |
| t-butoxybenzene | 13 | 8 | — | — | 23 | 10 | 131 | 130 | 114 | 98 | 81 |
| Acetophenone | — | — | — | — | — | — | — | — | — | — | — |
| Naphthalene | 24 | 19 | 15 | 13 | — | — | 63 | 73 | 68 | 78 | 65 |
| α-Methylbenzyl alcohol | — | — | — | — | — | — | — | — | — | — | — |
| Biphenyl | 23 | 20 | 19 | 12 | 27 | 17 | 112 | 108 | 110 | 110 | 119 |
| Dibenzyl | — | — | — | — | 52 | 20 | — | — | — | — | — |
| Benzoic acid | 682 | 502 | 350 | — | — | — | 1822 | 1780 | 1267 | 892 | 872 |
| Phenyl benzoate | 220 | 198 | 180 | 134 | 313 | 206 | 321 | 304 | 317 | 320 | 318 |
| Acetone | — | — | — | — | — | — | — | — | — | — | — |
| t-Butanol | — | — | — | — | — | — | — | — | — | — | — |
| di-n-Butylether | 27 | 12 | — | — | 18 | — | 83 | 85 | 72 | 51 | 36 |
| Butyl acetate | — | — | — | — | — | — | — | — | — | — | — |
| Butyl propionate | — | — | — | — | 7 | — | 56 | 62 | 45 | 37 | 41 |
| n-Butanol | 13 | — | — | — | — | — | 62 | 70 | 45 | 37 | 41 |
| n-Butytacrylate | 7 | — | — | — | — | — | 45 | 30 | 30 | 13 | 15 |
| 2-Ethylhexyl acetate | 18 | — | — | — | — | — | 37 | 29 | 30 | 25 | 38 |
| 2-Ethylhexanol | 19 | 10 | — | — | — | — | 40 | 42 | 38 | 34 | 34 |
| Components with benzene rings and boiling point < 150° C. | 220 | 75 | 23 | 5 | 159 | 11 | 797 | 829 | 516 | 305 | 302 |
| Components with benzene rings and boiling point < 200° C. | 431 | 230 | 123 | 72 | 346 | 102 | 1352 | 1424 | 991 | 717 | 584 |
| Components with benzene rings | 1380 | 959 | 687 | 231 | 738 | 345 | 3670 | 3701 | 2753 | 2117 | 1958 |
| Total volatile components | 1464 | 981 | 687 | 231 | 763 | 345 | 3993 | 4019 | 2985 | 2277 | 2124 |

TABLE 3

| | Fixing Temperature Range (° C.) | Image fogging | Odor |
|---|---|---|---|
| Example 1 | 135–230 | ○ | Δ |
| Example 2 | 135–230 | ○ | ○ |
| Example 3 | 135–230 | ○ | ○ |
| Example 4 | 130–220 | Δ | ○ |
| Example 5 | 120–230 | ○ | Δ |
| Example 6 | 120–230 | Δ | ○ |
| Comp. Ex. 1 | 135–230 | ○ | × |
| Comp. Ex. 2 | 135–230 | ○ | × |
| Comp. Ex. 3 | 135–230 | Δ | × |
| Comp. Ex. 4 | 135–230 | × | Δ |
| Comp. Ex. 5 | 135–230 | × | ○ |

According to the present invention, the content of volatile components in binder resins and, particularly, the content of volatile components with benzene rings can be reduced to provide toner binder resins with surprisingly low odor and excellent charging stability.

Having described the present invention, it will be quite apparent to one skilled in the art that many changes and modifications may be made to the above-described embodiments without departing from the spirit and the scope of the present invention.

What is claimed as:

1. A toner binder resin, comprising a copolymer of a styrene-based monomer and another copolymerizable vinyl-based monomer or a mixture thereof, wherein total content of volatile components is no greater than about 1,500 ppm, a content of volatile components with benzene rings is no greater than about 1,400 ppm, and a content of volatile components with benzene rings and a boiling point of below 200° C. is no greater than about 500 ppm.

2. The toner binder resin of claim 1, wherein the total content of volatile components is no greater than about 1000 ppm.

3. The toner binder resin of claim 2, wherein the total content of volatile components is no greater than about 800 ppm.

4. The toner binder resin of claim 1, wherein the content of volatile components with benzene rings is no greater than about 1,000 ppm.

5. The toner binder resin of claim 4, wherein the content of volatile components with benzene rings is no greater than about 800 ppm.

6. The toner binder resin of claim 1, wherein the content of volatile components with benzene rings and a boiling point of below 200° C. is no greater than about 400 ppm.

7. The toner binder resin of claim 1, wherein the content of volatile components with benzene rings and a boiling point of below 150° C. is no greater than about 300 ppm.

8. The toner binder resin of claim 7, wherein the content of volatile components with benzene rings and a boiling point of below 150° C. is no greater than about 250 ppm.

9. The toner binder resin of claim 8, wherein the content of volatile components with benzene rings and a boiling point of below 150° C. is no greater than about 200 ppm.

10. The toner binder resin of claim 9, wherein the content of volatile components with benzene rings and a boiling point of below 150° C. is no greater than about 100 ppm.

11. The toner binder resin of claim 1, wherein the glass transition temperature is at least about 40° C.

12. The toner binder resin of claim 11, wherein the glass transition temperature is about 45–80° C.

13. The toner binder resin of claim 1, which has at least one peak in the molecular weight range of about 4,000–50,000 in the molecular weight distribution according to gel permeation chromatography of the tetrahydrofuran-soluble portion.

14. The toner binder resin of claim 13, which has at least one peak in the molecular weight range of about 5,000–45,000 in the molecular weight distribution according to gel permeation chromatography of the tetrahydrofuran-soluble portion.

15. The toner binder resin of claim 1, which has at least one peak in the molecular weight range of about 4,000–50,000 and at least one peak in the molecular weight range of about 80,000–500,000, in the molecular weight distribution according to gel permeation chromatography of the tetrahydrofuran-soluble portion.

16. The toner binder resin of claim 15, which contains about 10–60 wt % of a component with at least one peak in the molecular weight range of about 80,000–500,000 in the molecular weight distribution according to gel permeation chromatography of the tetrahydrofuran-soluble portion.

17. The toner binder resin of claim 1, which contains about 5–55% of a tetrahydrofuran-insoluble portion.

18. The toner binder resin of claim 1, wherein the mean particle size is 10–400 μm.

19. The toner binder resin of claim 18, wherein no more than 5 wt % of the particles have a particle size of 1,000 μm or greater.

20. The toner binder resin of claim 18, wherein the mean particle size is 110–300 μm.

21. The toner binder resin of claim 20, wherein no more than 2 wt % of the particles have a particle size of 1,000 μm or greater.

22. The toner binder resin of claim 1, wherein the weight average molecular weight is in the range of 50,000–300,000.

23. The toner binder resin of claim 22, wherein the weight average molecular weight is in the range of 70,000–200,000.

24. The toner binder resin of claim 1, wherein the ratio (Mw/Mn) of the weight average molecular weight (Mw) and the number average molecular weight (Mn) is in the range of 3–40.

25. The toner binder resin of claim 24, wherein Mw/Mn is in the range of 5–30.

26. The toner binder resin of claim 1, wherein the ratio (Mz/Mn) of the z average molecular weight (Mz) and the number average molecular weight (Mn) is in the range of 10–300.

27. The toner binder resin of claim 26, wherein Mz/Mn is in the range of 15–250.

28. A process for the production of a toner binder resin, which comprises the steps of:

a) polymerizing monomers for the resin;

b) heat treating the resin with a temperature increase to at least 110° C. under pressurization; and then c) removing volatile components from the resin by distillation.

29. The process of claim 28, wherein the heat treatment is carried out at least 120° C.

30. The process of claim 28, wherein the heat treatment is carried out under a sealed condition.

31. The process of claim 28, wherein the polymerization is accomplished using, in combination, two or more polymerization initiators with different half-life temperatures.

32. The process of claim 31, wherein the polymerization is suspension polymerization.

* * * * *